United States Patent
King

[15] 3,668,193
[45] June 6, 1972

[54] VINYLIDENE FLUORIDE COATING COMPOSITIONS CONTAINING POLYIMIDES

[72] Inventor: James Ping King, Lansdale, Pa.

[73] Assignee: Pennwalt Corporation, Philadelphia, Pa.

[22] Filed: Jan. 27, 1971

[21] Appl. No.: 110,258

[52] U.S. Cl. ............... 260/857 PA, 117/124 E, 117/132 CF, 117/138.8 B, 117/138.8 UF, 117/148, 117/161 P, 117/161 UN, 260/31.8 M, 260/31.8 N, 260/31.8 F, 260/31.2 N, 260/32.4, 260/32.8 N, 260/33.2 R, 260/33.6 F, 260/37 N
[51] Int. Cl. .......................................................... C08g 41/04
[58] Field of Search .............................. 260/857 PI; 117/161

[56] References Cited
UNITED STATES PATENTS

| | | | |
|---|---|---|---|
| 3,005,795 | 10/1961 | Foremming Busse | 260/857 PI |
| 3,316,212 | 4/1967 | Angelo | 260/857 PI |
| 3,356,759 | 12/1967 | Gerow | 260/857 PI |
| 3,356,760 | 12/1967 | Matray | 260/857 PI |
| 3,391,221 | 7/1968 | Gore | 260/857 PI |

*Primary Examiner*—Paul Lieberman
*Attorney*—Carl A. Hechmer, Jr. and Stanley Litz

[57] ABSTRACT

This disclosure concerns vinylidene fluoride polymer compositions containing a minor proportion of polyamide-acid resin which, after heat-curing of the composition, is converted to a polyimide resin. The coatings and films made from the cured composition have self-lubricating characteristics, improved wear resistance and impact resistance and better adhesion to substrates.

15 Claims, No Drawings

VINYLIDENE FLUORIDE COATING COMPOSITIONS CONTAINING POLYIMIDES

The present invention relates to vinylidene fluoride polymer coating compositions, cured films of said compositions, and substrates coated with said cured films. More particularly, this invention concerns a vinylidene fluoride polymer composition containing a minor proportion of polyamide-acid resin, which subsequent heat-curing converts to a polyimide resin.

Vinylidene fluoride polymers are recognized and used by the chemical industry, construction industries, and related industries as high performance resin coatings. In certain applications, however, polyvinylidene fluoride resin coatings are found to have insufficient resistance to certain solvents, a lower than desired softening point, inadequate lubricity, and poorer than desired adhesiveness to the substrate. This invention alleviates the foregoing deficiencies by providing a modified polyvinylidene fluoride resin composition having higher melting point, better solvents and chemicals resistance, better adhesion to substrates, self-lubricating characteristics, and better wear resistance. The compositions may be applied to such substrates as metals, e.g., steel, aluminum, copper, brass, etc., glass and to fabrics made of natural or synthetic fibers. It is an advantage of the invention that metal substrates, such as steel, do not require special treatment, for example, sandblasting, galvanizing or priming with epoxy resins, in order to obtain the desired level of adhesiveness thereto of the coatings embodied herein.

A brief but comprehensive survey of polymerization techniques used in preparing vinylidene fluoride polymers embodied in the composition of this invention is found in the specifications of U.S. Pat. No, 2,435,537 to Ford et al., and U.S. Pat. No. 3,193,539 to M. Hauptschein. The terms "vinylidene fluoride polymer" and "polyvinylidene fluoride" used herein refer not only to the normally solid high molecular weight film-forming homopolymers of vinylidene fluoride, but also the normally solid high molecular weight, film-forming vinylidene fluoride copolymers containing at least about 75 mol percent of vinylidene fluoride. Suitable comonomers are the halogenated ethylenes such as sym.-dichlorodifluoroethylene, 1-chloro-1,2,2-trifluoroethylene, tetrafluoroethylene, hexafluoropropene, vinyl fluoride, vinyl chloride and the like. When at least about 75 mol percent of vinylidene fluoride is present, the important chemical resistance, resistance to the deteriorative effects of the sun and weather, and mechanical characteristics of the copolymers of vinylidene fluoride are essentially the same as the homopolymer. These vinylidene fluoride polymers and copolymers have softening points ranging from about 120° C. to 180° C., the homopolymers generally having the higher softening temperatures. The primary particle sizes of the particulate polyvinylidene fluoride in the coating formulations herein described are, in general, within the range of about 0.05 micron to about 1 micron in diameter. However, these particles are present in the dispersions described below as agglomerates containing from 1 to about 35 primary particles, preferably from 1 to 10 particles per agglomerate.

One embodiment of the present invention is: (A) a film-forming composition comprised of a dispersion in organic liquid solvent of vinylidene fluoride polymer, and in admixture in said solvent, a polyamide-acid component comprising the reaction product of an organic diamine and tetracarboxylic acid dianhydride, the proportion of the polyamide-acid component to the vinylidene fluoride polymer being from about 10 to about 40 parts by weight, preferably from about 20 to 30 parts, per 100 parts by weight of vinylidene fluoride polymer. When the polyamide-acid component exceeds about said 40 parts per 100 parts of the base resin, the impact strength of the cured compositions is considerably less than desired.

The polyamide-acid component is the well known precursor of the polyimide which is formed by exposure of the polyamide-acid to elevated temperatures. More specifically, the polyamide-acid is of a diamine of the formula $H_2N-R'-NH_2$ where $R'$ is arylene (a divalent aromatic radical), and a tetracarboxylic acid dianhydride of the formula

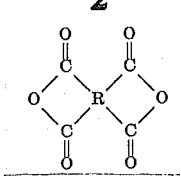

where R is a tetravalent organic radical. Preferably, R' is selected from the group consisting of arylene radicals in metaphenylenediamine, paraphenylene-diamine, benzidine, 4,4'-diaminodiphenyl propane, 4,4'-diaminodiphenyl methane, 4,4'-diaminodiphenyl ether, 4,4'-diaminodiphenyl sulfone and 4,4'-diaminodiphenyl sulfide, and R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride. The formation of such polyamide-acids (polyimide precursors) and their conversion into polyimides by heating are described in the literature, for example, the Kirk-Othmer "Encyclopedia of Chemical Technology", 2nd edition, vol. 16, pg. 42; and U.S. Pat. Nos. 2,710,853, 3,356,759 and 3,356,760, and may be illustrated by the following structures:

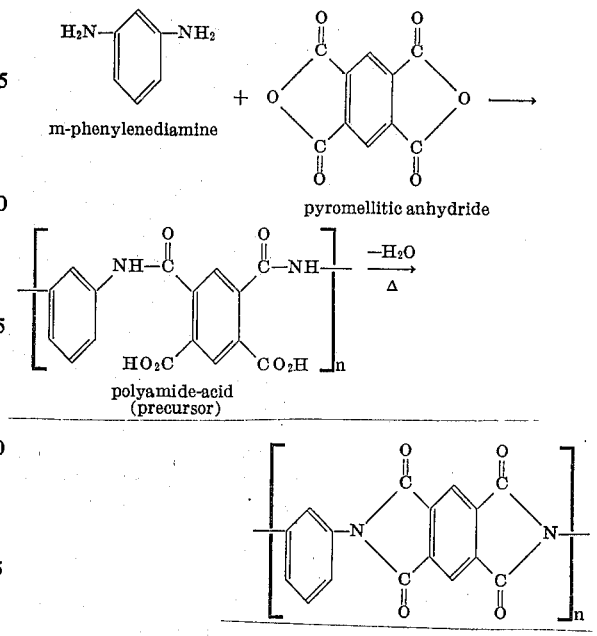

The polyamide-acid compositions will in general have a viscosity of the order of 10 to 90 poises, preferably 60–90 poises, measured as a 53 percent solution in a mixture of N-methylpyrollidone-xylene solvents by Brookfield Viscometer Model LVF, Spindle No. 3, 12 r.p.m.

The usual method of utilizing the coating composition of this invention is to prepare films or coatings on a substrate from a non-agueous dispersion of polyvinylidene fluoride in an organic latent solvent containing in admixture the polyamide-acid (polyimide precursor) component homogeneously mixed with the dispersion. A latent solvent is defined in the art as an organic liquid having a boiling point (at atmospheric pressure) above about 50° C., preferably about 100° – 300° C., which liquid has no significant solvent or swelling action on polyvinylidene fluoride at room temperature, but at an elevated temperature exerts a solvent action sufficient to cause the vinylidene fluoride polymer particles to coalesce. Representative latent solvents include tetraethylurea, dimethyladipate, diethyladipate, diethylsuccinate, dimethylphthalate, diethylphthalate, diethyloxalate, triethylphosphate, diethylformamide, dimethylsebacate, dimethylsuccinate, propylene carbonate, ethylene carbonate, gamma butyrolacetone, 2-nitropropane, acetone, 4-methoxy-4 methyl pentanone-2, isophorone, methyl ethyl ketone, cyclohexanone, 2-methoxyethylacetate, 2-butoxyethylacetate, 2-ethoxyethylacetate, diethylene glycol monoethyl ether acetate, hexylacetate, diacetone alcohol and others well known in the art. In general, the quantity of the latent solvent in the polymeric dispersion will be in the range of from about 80 to about 300 parts by weight per 100 parts by weight of polyvinylidene fluoride. Obviously, the viscosity of the polymeric dispersion is decreased as the relative proportion of latent solvent therein increased. If desired, other organic volatile diluents which have no latent solvating action on the vinylidene fluoride polymer may be added to reduce the dispersion viscosity, to improve the flow characteristics, and to promote the wetting action of the latent solvent on the polymer powder. The amount of the volatile diluent may be as much as up to about 100 parts by weight per 100 parts of the polyvinylidene fluoride. Examples of such non-solvent diluents are xylene, toluene, diisobutylketone, N-methyl pyrollidone, aliphatic naphthas, aromatic naphthas, methyl isobutyl carbinol and others well known in the art. The viscosity of the dispersion can be further reduced by adding from about 0.01 to about 2 parts of a cationic surfactant per 100 parts by weight of dispersion solids as disclosed in U.S. Pat. No. 3,441,531. Finely divided pigments (e.g., titanium dioxide, zinc oxide, zinc sulfide, barium sulfate, etc.) and other particulate solids such as stainless steel powder or flakes, graphite powder, mica, and tungsten carbide may be included in the dispersions.

In order to impart even more lubricity to the coatings and films prepared from the described compositions, there can be mixed with the dispersion a minor proportion of particulate tetrafluoroethylene polymer (PTFE), i.e., from 0 up to about 30 parts and preferably from about 15 to about 25 parts by weight per 100 parts by weight of the vinylidene fluoride polymer. The terms "tetrafluoroethylene polymer" and "-polytetrafluoroethylene (PTFE)" used herein mean not only the normally solid high-molecular weight tetrafluoroethylene homopolymers (such as described in U.S. Pat. No. 2,559,752) but also the normally solid high-molecular weight copolymers of tetrafluoroethylene containing a predominance of tetrafluoroethylene units, for example, with up to about 30 mole percent of comonomers such as vinylidene fluoride, 1-chloro-1-fluoroethylene, hexafluoropropene, trifluorochloroethylene and the like, and also the lower-molecular weight tetrafluoroethylene polymers obtained by the pyrolysis of normally solid high-molecular weight polytetrafluoroethylene such as described in U.S. Pat. Nos. 2,496,978 and 2,978,519.

The aforesaid dispersions are conveniently prepared by mixing the powdered vinylidene fluoride polymer, latent solvent, optional volatile solvent, the polyamide-acid component, and optional pigments, other solids and tetrafluoroethylene polymer, if desired, in a suitable mixing apparatus such as a paint mill, sand mill, ball mill, rod mill, or a high-shear blending unit. Well known techniques for laying down the coating composition involve applying the dispersion by spraying or dip coating, or by doctor blade or reverse roll coating to the substrate (e.g., metal, cloth, plastic, wood, glass, etc.). The coated material is inserted in an oven and dried and cured at from about 250° F. to about 650° F. At these elevated temperatures conversion of the polyamide-acid precursor to the polyimide takes place simultaneously with the fusion and curing of the matrix vinylidene fluoride polymer to leave a film comprised of this durable and compatible resinous mixture. Unsupported films of the vinylidene fluoride polymer-polyimide mixture can be obtained by doctor blade coating the dispersion on a polytetrafluoroethylene sheet or PTFE-coated surface, followed by curing at 250° to 650° F., and, after cooling, removing the film from the non-adherent substrate. Another method of preparing unsupported film is to coat a thin aluminum foil with the desired thickness, and after heat-curing and cooling, removing the aluminum therefrom by immersion in 20% HCl solution to dissolve the tin foil and leave the film, which is then water-rinsed and dried.

In accordance with this invention, other embodiments of this invention thus constitute: (B) a coated substrate prepared by mixing together vinylidene fluoride polymer, a latent solvent, and a minor proportion of a polyamide-acid to form a coating (film-forming) composition, coating a substrate with said composition and heating the coating to produce a dried and cured film on said substrate composed of a blend of about 10 to 40 parts by weight, preferably 20 to 30 parts, of a polyimide of a polyamide-acid having recurring units of the formula

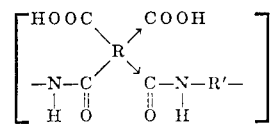

wherein the arrows denote isomerism, and wherein R is a tetravalent organic radical and R' is arylene as previously denoted, per 100 parts by weight of vinylidene fluoride polymer; and (C) the resinous cured films thus produced, supported or unsupported. As previously mentioned, the polymer blend can optionally contain up to about 30 parts by weight of tetrafluoroethylene polymer, preferably 15 – 25 parts, per 100 parts by weight of vinylidene fluoride polymer, and other modifying solids such as pigments. Films and coatings having thicknesses on the order of about 0.5 mil to 15 mils are prepared in the foregoing manner.

The excellent properties and advantages of the present compositions are illustrated by the following examples which are exemplary only and should not be construed as limitative of the scope of the invention as described and claimed herein. In the example all ingredients are measured in parts by weight and mixtures are defined by the weight percents of their components.

EXAMPLE 1

150 parts of a representative polyimide precursor (polyamide-acid) composed of the recurring unit

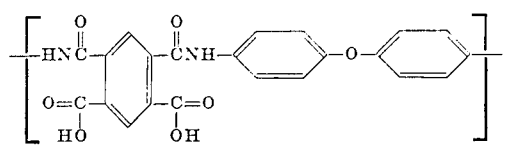

in a solvent mixture (134 parts) of a major proportion of N-methylpyrrolidone and a minor proportion of xylene (viscosity of 60 – 90 poises, Brookfield Viscometer Model LVF, Spindle No. 3, 12 r.p.m.) is slowly mixed with a dispersion of 450 parts of particulate polyvinylidene fluoride in 550 parts of a latent solvents mixture (4:1 weight ratio) of dimethyl phthalate and diisobutyl ketone ("Kynar 202" vinylidene fluoride polymer, product of Pennwalt Corporation). An additional 200 parts of this solvents mixture is added to provide a dispersion containing 36,8% total non-volatiles (i.e., resins).

The above-prepared dispersion is sprayed on cold-rolled steel, anodized aluminum, untreated aluminum and SAE 4620 ring, and the coatings cured at 148° C. for 3 hours and then 190° C. for 1 hour. Average dry film thickness is 1.5 mils. The polyamide-acid component therein is thereby converted to the polyimide of the recurring unit

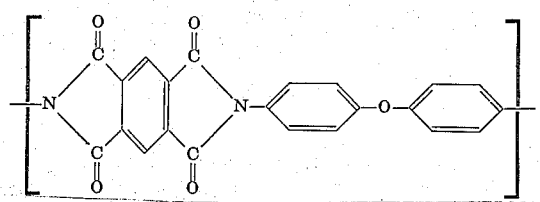

Impact resistances of the coatings on steel are measured by 60 inch-pounds impact on a seven-eighth inch steel ball, and the coatings neither rupture nor delaminate. A coated steel panel is placed in a salt spraying chamber and a few blisters of number 8 in size are observed after an extended period of eleven days. Pencil hardness of the coatings range between H and 3H. Contact angles with water are between 70° and 90°.

Various organic solvents such as xylene, methylene chloride and methylethyl ketone have no effect on the coatings after 16 hours of immersion. The coatings are also resistant to 35% HCl, 50% $H_2SO_4$ and 50% NaOH; however, slight loss of adhesion and darkening in color is observed after contact with 35% $HNO_3$ (16 hours of watch glass test).

Erosion rate on the coated SAE 4620 rings against RC30–27 blocks, as measured on an Alpha Model LFW–1 Lubricant Tester, are 0.0073 to 0.0147 mils/min (72 RPM or 25 ft/min. of speed and 630 lbs. load). The pressures at failure range from 32,000 to 46,000 psi. Static and dynamic coefficients of friction are 0.23 and 0.07 to 0.16 respectively.

EXAMPLE 2

A solution of 50 parts of the polyimide precursor employed in the previous example in 90 parts of the same solvent is mixed with a dispersion of 122 parts of the particulate polyvinylidene fluoride in 148 parts of dimethyl phthalate-diisobutyl ketone solvents mixtures, and 50 parts of a 50 percent aqueous latex of high molecular weight tetrafluoroethylene polymer ("Tetran 30"PTFE, product of Pennwalt Corporation). One hundred parts of the solvents mixture is added thereto to give a dispersion containing 36 percent total polymer constituents.

The dispersion is sprayed on SAE rings, anodized aluminum and cold-rolled steel panels, and the coatings are cured at 190° C. for 1 hour (dried film thickness—1 mil). Contact angles with water are between 90° and 105°.

Impact strength of the coated aluminum and cold-rolled steel panels are measured by 60 inch-pounds impact on a seven-eighth inch steel ball, and the coatings neither rupture nor delaminate. A coated steel panel is inscribed with crosshair lines and placed in a salt spraying chamber. There is no change in the coating after 7 days except normal rusting along the inscribed lines; however, rusting is propagating underneath the coating along the inscribed lines after 13 days.

Average erosion rate of 1 mil coatings on SAE 4620 rings against RC 30–27 blocks, as measured on the Alpha LFW–1 Lubricant Tester is 0.033 mils/min (72 RPM or 26 ft/min.) with the maximum load of 630 pounds. Average pressure at failure is 44,000 psi. Static and dynamic coefficients of friction are 0.12 and 0.07 to 0.13, respectively.

EXAMPLE 3

The procedure of Example 2 is repeated except that for the tetrafluoroethylene polymer (PTFE) latex in the dispersion is substituted 30 parts of lower molecular weight tetrafluoroethylene polymer (as obtained by pyrolysis of high molecular weight PTFE according to the procedure of U.S. Pat. No. 2,496,978) dispersed in 50 parts dimethyl phthalate; this additive is a paste like PTFE dispersion. The vinylidene fluoride polymer/polyamide-acid/PTFE dispersion is used to coat substrates as in the previous example, followed by heat-curing. The coated aluminum and steel panels are evaluated and found to have properties similar to those described in Example 2.

EXAMPLE 4

To a dispersion of 243 parts of the previously described particulate vinylidene fluoride polymer in 297 parts of mixed solvents (dimethyl phthalate and diisobutylketone, 4:1 weight ratio) are added 100 parts of the aforementioned polyamide-acid (polyimide precursor) in solution with 90 parts N-methylpyrollidone and xylene solvents, 30 parts additional N-methylpyrollidone, and 60 parts aqueous polytetrafluoroethylene latex containing 50 percent PTFE ("Tetran 30" PTFE, product of Pennwalt Corporation) and 200 parts additional dimethylphthalate-diisobutylketone solvents mixture.

The resulting dispersion (34 percent non-volatile content) is gently agitated for 10 minutes and then sprayed on SAE 4620 rings, anodized aluminum and cold-rolled steel panels. The coated samples are first cured at 160°–180° C. for 1 hour and then 190° C. for 50 minutes. The average thickness of dried film on the coated panels is 1.5 mils and on the SAE rings, 0.5 mil.

Impact resistances of the coated aluminum and steel panels are measured by 60 inch-pounds impact on a seven-eighth inch steel ball, and the coatings neither rupture nor delaminate. The average erosion rate of the coated SAE rings against RC 30–27 blocks as measured on the Alpha LFW–1 Lubricant Tester with a speed of 72 RPM (26 ft/min.) at a maximum load of 630 pounds is 0.0343 mils/min. The average pressure at failure is 46,000 psi. Static and dynamic coefficients of friction are 0.10 and 0.07 to 0.12, respectively. The results of salt spraying on a coated panel show very slight blistering along the inscribed lines after 6 days.

I claim:

1. A film forming composition comprised of a dispersion in organic liquid solvent of vinylidene fluoride polymer containing at least about 75 mol percent of vinylidene fluoride and in admixture in said solvent, a polyamide-acid of a diamine of the formula $H_2N-R'-NH_2$ where $R'$ is arylene and a tetracarboxylic acid dianhydride of the formula

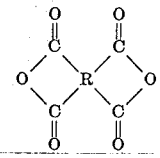

where R is a tetravalent organic radical, the proportion of the polyamide-acid component to the vinylidene fluoride polymer being from about 10 to about 40 parts by weight per 100 parts by weight of vinylidene fluoride polymer.

2. A composition according to claim 1 wherein the polyamide-acid component is from about 20 to 30 parts per 100 parts of the vinylidene fluoride polymer.

3. A composition according to claim 1 wherein the dispersion contains in admixture from 0 to about 30 parts by weight of tetrafluoroethylene polymer per 100 parts by weight of vinylidene fluoride polymer.

4. A composition according to claim 3 wherein the amount of tetrafluoroethylene polymer is from about 15 to about 25 parts per 100 parts of the vinylidene fluoride polymer.

5. A composition according to claim 1 where in the polyamide-acid component $R'$ is selected from the group consisting of arylene radicals in metaphenylenediamine, para-phenylenediamine, benzidine, 4,4'-diaminodiphenyl propane, 4,4'-diaminodiphenyl methane, 4,4'-diaminodiphenyl ether, 4,4'-diaminodiphenyl sulfone and 4,4'-diaminodiphenyl sulfide, and R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'2,2-bis(3,4-dicarboxyphenyl) propane dianhydride, bis(3,4-dicarboxyphenyl) sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride.

6. A coated substrate prepared by mixing together finely-divided vinylidene fluoride polymer containing at least about 75 mol percent of vinylidene fluoride, organic liquid solvent, and from about 10 to about 40 parts by weight per 100 parts by weight of the vinylidene fluoride polymer of polyamide-acid of a diamine of the formula H$_2$N-R'-NH$_2$ where R' is arylene and a tetracarboxylic acid dianhydride of the formula

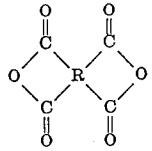

where R is a tetravalent organic radical, to form a film-forming composition, coating a substrate with said composition and heating the coating to produce a dried and cured film on said substrate composed of a blend of the vinylidene fluoride polymer and the polyimide of the polyamide-acid precursor.

7. A substrate according to claim 6 wherein the polyimide component is from about 20 to 30 parts per 100 parts of the vinylidene fluoride polymer.

8. A substrate according to claim 6 wherein the coating contains from 0 to about 30 parts by weight of tetrafluoroethylene polymer per 100 parts by weight of vinylidene fluoride polymer.

9. A substrate according to claim 8 wherein the amount of tetrafluoroethylene polymer is from about 15 to about 25 parts per 100 parts of the vinylidene fluoride polymer.

10. A substrate according to claim 6 where the polyimide is derived from a polyamide-acid in which R' is selected from the group consisting of arylene radicals in metaphenylenediamine, para-phenylene-diamine, benzidine, 4,4'-diaminodiphenyl propane, 4,4'-diaminodiphenyl methane, 4,4'-diaminodiphenyl ether, 4,4'-diaminodiphenyl sulfone and 4,4'diaminodiphenyl sulfide, and R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2'3,3'-diphenyl tetracarboxylic dianhydride, 2,2-bis(3,4-dicarboxyphenyl) propane dianhydride, bis(3,4-dicarboxyphenyl) sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride. where R is a tetravalent organic radical.

12. A film according to claim 11 wherein the polyimide is from about 20 to 30 parts per 100 parts of the vinylidene fluoride polymer.

13. A film according to claim 11 containing from 0 to about 30 parts by weight of tetrafluoroethylene polymer per 100 parts by weight of vinylidene fluoride polymer.

14. A film according to claim 13 wherein the amount of tetrafluoroethylene polymer is from about 15 to about 25 parts per 100 parts of the vinylidene fluoride polymer.

15. A film according to claim 11 where the polyimide is derived from a polyamide-acid in which R' is selected from the group consisting of arylene radicals in metaphenylenediamine, para-phenylene-diamine, benzidine, 4,4'-diaminodiphenyl propane, 4,4'-diaminodiphenyl methane, 4,4'-diaminodiphenyl ether, 4,4'-diaminodiphenyl sulfone and 4,4'-diaminodiphenyl sulfide, and R is selected from the group consisting of aromatic radicals in pyromellitic dianhydride 2,3,6,7-naphthalene tetracarboxylic dianhydride, 3,3',4,4'-diphenyl tetracarboxylic dianhydride, 1,2,5,6'-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl)sulfone dianhydride, 3,4,9,10-perylene tetracarboxylic dianhydride, bis(3,4-dicarboxyphenyl) ether dianhydride and 3,4,3',4'-benzophenone tetracarboxylic dianhydride.

11. A resinous cured film comprised of a blend of 100 parts by weight vinylidene fluoride polymer containing at least about 75 mol percent of vinylidene fluoride and from about 10 to about 40 parts by weight of a polyimide of a polyamide-acid of a diamine of the formula H$_2$N-R' -NH$_2$ where R' is arylene and a tetracarboxylic acid dianhydride of the formula

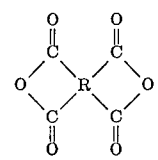

* * * * *

PO-1050
(5/69)

UNITED STATES PATENT OFFICE
CERTIFICATE OF CORRECTION

Patent No. 3,668,193      Dated June 6, 1972

Inventor(s) James Ping King (Appln. 110,258)

It is certified that error appears in the above-identified patent and that said Letters Patent are hereby corrected as shown below:

Column 2, line 22, close parenthesis after "3,4-dicarboxyphenyl" before -- ether --

Column 2, line 55, insert "polyamide" beneath chemical structure.

Column 3, line 16, insert "is" after "therein" -- and before "ether".

Column 3, line 42, delete dash at end of line after quote mark.

Column 4, line 6, "tin" should read -- thin --.

Column 4, line 69, "38,8%" should read -- 36.8% -- .

Claim 5, Column 6, line 71, insert "diphenyl tetracarboxylic dianhydride" after 2,2',3,3' and before 2,2-bis (3,4-

Claim 10, Column 8, line 3, delete "where R is a tetravalent organic radical" This phrase belongs after the chemical formula of claim 11.
Claim 15
/Column 8, line 23, "6' naptholene " should read -- 6 naptholene--.

Claim 11, Column 8 is not in numerical order. Insert "where R is a tetravalent organic radical" after the chemical formula of this claim 11.

Signed and sealed this 6th day of March 1973.

(SEAL)
Attest:

EDWARD M. FLETCHER, JR.
Attesting Officer

ROBERT GOTTSCHALK
Commissioner of Patents